United States Patent [19]
Marwick

[11] Patent Number: 5,425,824
[45] Date of Patent: Jun. 20, 1995

[54] COLOR-CHANGEABLE ADHESIVE

[75] Inventor: William F. Marwick, Northants, England

[73] Assignee: Alcan International Ltd., Montreal, Canada

[21] Appl. No.: 967,940

[22] Filed: Oct. 28, 1992

Related U.S. Application Data

[63] Continuation of Ser. No. 742,227, Aug. 6, 1991, abandoned, which is a continuation of Ser. No. 352,558, May 16, 1989, abandoned.

[30] Foreign Application Priority Data

May 17, 1988 [GB] United Kingdom ............... 8811669

[51] Int. Cl.$^6$ ............................................. C09J 5/00
[52] U.S. Cl. ..................................... 156/64; 156/330; 523/400; 523/427
[58] Field of Search ............... 156/64, 330; 523/400, 523/403, 428, 427; 252/62.54

[56] References Cited

U.S. PATENT DOCUMENTS

| | | | |
|---|---|---|---|
| 3,770,547 | 11/1971 | Kelsey | 156/64 |
| 3,773,706 | 11/1973 | Dunn, Jr. | 528/62 |
| 4,164,492 | 8/1979 | Cooper | 523/461 |
| 4,343,885 | 8/1982 | Reardon, Jr. | 430/344 |
| 4,896,904 | 1/1990 | Gadsden et al. | 156/86 |
| 4,920,091 | 4/1990 | Iwakura et al. | 503/211 |

FOREIGN PATENT DOCUMENTS

| | | | |
|---|---|---|---|
| 0703098 | 2/1965 | Canada | 156/64 |
| 0351365 | 3/1990 | European Pat. Off. | |
| 2445715 | 4/1976 | Germany | 156/64 |
| 3703887 | 8/1988 | Germany | 156/330 |
| 0049233 | 4/1976 | Japan | 156/64 |
| 0093772 | 5/1984 | Japan | 156/330 |
| 1211016 | 9/1986 | Japan | 156/330 |
| 0960276 | 6/1964 | United Kingdom | |
| 2603101 | 8/1977 | United Kingdom | |

OTHER PUBLICATIONS

Gilbert et al., "Mechanism of the Dicyandiamide/Epoxide Reaction," Macromolecules, vol. 24 (1991), pp. 360–369.
Patrick, ed., Treatise on Adhesion and adhesives, vol. 3 (1973), pp. 79–122.
CA 93(14):141030s.
CA 108(6):39563j.
CA 118(20):193531k.
CA 118(12):104701a.
CA 111(16):136219w.
Matsuoka Masaru, "The chemistry of special dyes for electro–optical applications," Japan pp. 1–9.

Primary Examiner—Virginia Manoharan
Attorney, Agent, or Firm—Cooper & Dunham

[57] ABSTRACT

An adhesive composition constituted of a mixture of a one-part heat-curable adhesive and a substantially water-insoluble indicator material which is substantially unreactive with the components of the one-part heat-curable adhesive (i.e. curable resin, heat-activatable curing agent for the resin and accelerator) but which has the ability to produce a color change in the composition on curing of the adhesive. Preferably, the adhesive is a one-part heat-curable epoxy adhesive system. The use of the adhesive composition enables a visible detemination of the point of cure of the adhesive.

7 Claims, 1 Drawing Sheet

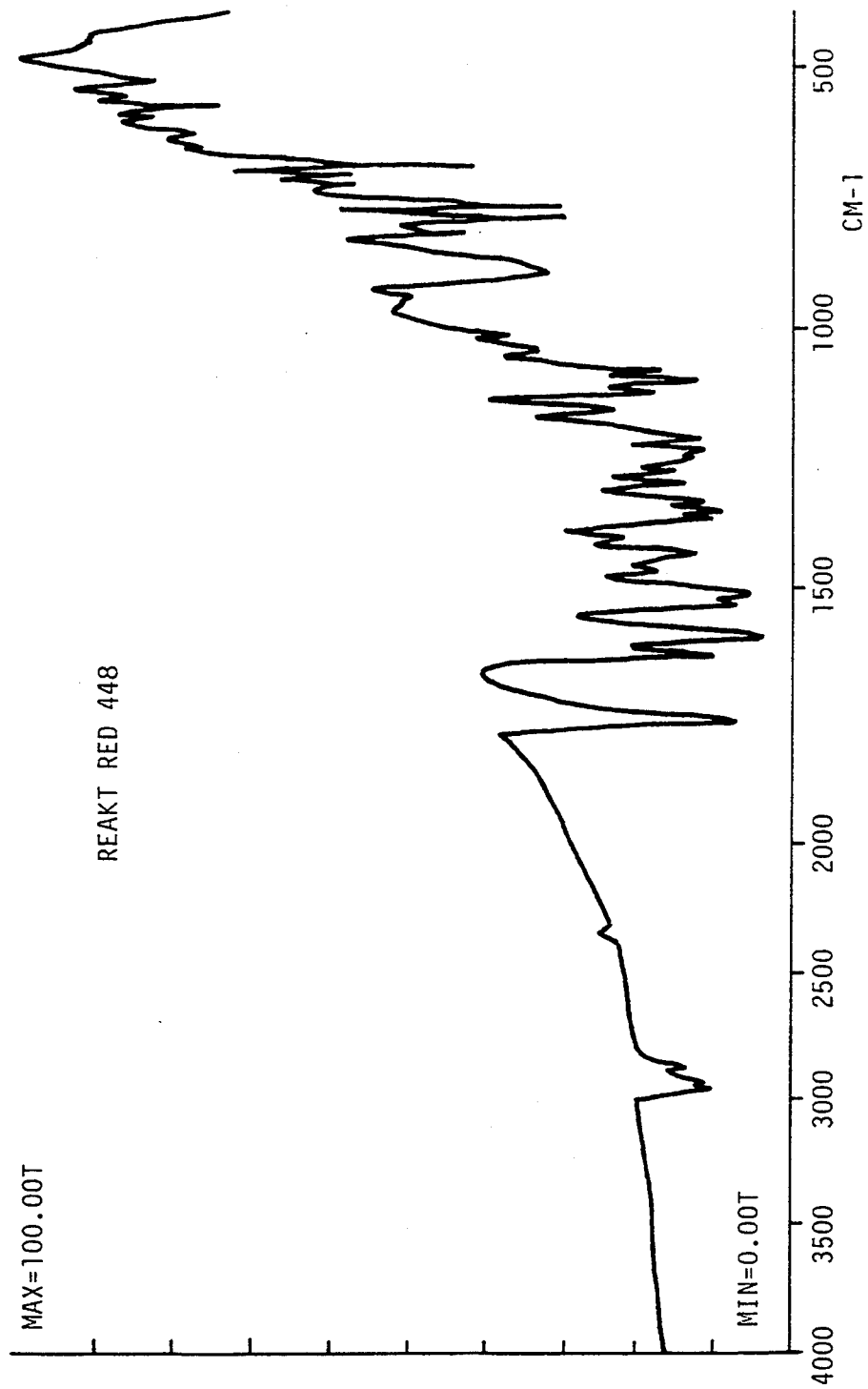

COLOR-CHANGEABLE ADHESIVE

This is a continuation of application Ser. No. 742,227, filed Aug. 6, 1991, abandoned, which is a continuation of application Ser. No. 352,558, filed May 16, 1989, abandoned.

The present invention relates to a color-changeable adhesive. More particularly, it relates to a one-part heat-curable adhesive, especially a one-part heat-curable epoxy adhesive, which has the ability to change color on curing.

Adhesive systems conventionally used in industrial processes are two-part systems or one-part systems. A two-part adhesive system is one which comprises a first component containing a curable resin and a second component containing a curing agent for the curable resin. Because these two components of a two-part adhesive system will start to react together, resulting in the cure of the resin, as soon as they are mixed together, they have to be stored separately and they can be mixed together only immediately prior to use. A one-part adhesive system, however, comprises a storage stable mixture of a curable resin and a heat-activatable curing agent for the curable resin and there is no reaction between the resin and the curing agent until the latter has become activated by heating. The present invention, as mentioned above, relates to such heat-curable one-part adhesive systems.

Of the various types of curable synthetic resins that may be used in adhesive formulations, one type which is important industrially is the family of epoxy resins. Epoxy adhesives which cure by the application of heat are widely used in industry. They have advantages over ambient-cure, two-part epoxy adhesives. Unlike these ambient-cure adhesives, heat-curable epoxy adhesives do not require an accurate mixing of two components. i.e. the resin and the cross-linker. Furthermore, compared to ambient-cure, two-part epoxy adhesives, heat-curable epoxy adhesives are capable of imparting to the adhesive joint a greater resistance to high temperature environments.

Unfortunately, however, heat-curable epoxy adhesives require accurate heat input during cure in order to obtain optimum performance in the adhesive joint. For instance, some heat curing epoxy adhesives are sensitive to over-cure, resulting in an inferior performance in a joint when the time in the oven was too long or when the oven temperature was too high. Other heat curing epoxy adhesives are sensitive to under-cure whereby the unreacted parts of the system are then vulnerable to adverse environments and the joint shows a weakening on exposure. In general, accurate heat input during cure is not difficult to achieve with large ovens but can be difficult to achieve using other methods of heating, especially using infra-red radiation. Yet infra-red radiative heating is very desirable for some adhesively bonded structures such as very large ones which may be too large to fit in an oven, or for situations such as adhesively bonded repairs, where heating is only locally necessary. The aim of the present invention is to facilitate accurate heat input in the heat curing of epoxy adhesives in situations where control has, previously been difficult.

U.S. Pat. No. 3,773,706 teaches the inclusion, into the curable resin component of a two-part adhesive system, of the basic dye Phenosafranin, i.e. 3,7-diamino-5-phenylphenazinium chloride. When the curing agent component is added to and mixed with the dye-containing resin component the curing reaction proceeds and, as that reaction proceeds, the color imparted by the dye undergoes change. According to Example II in Table I of U.S. Pat. No. 3,773,706 the color imparted by the dye to a two-part epoxy adhesive system undergoes a change at a temperature as low as 23° C.

U.S. Pat. No. 4,164,492 describes the use, in a two-part polyester or epoxy resin system for use in a body filler material or moulding composition, of a dye to indicate that uniform mixing of the two components has occurred and to indicate the extent to which the resin in the mixture has cured. The dye (especially a methyl derivative of azobenzene 4-azo-2 naphthol) is incorporated into one or the other components of the two-part system to impart a color thereto. The thoroughness of mixing the two components together is indicated by the uniformity of color in the mixture. The dye is one which loses its color as the curing reaction proceeds thereby providing a direct indication of the progress and ultimate completion of the cure of the resin.

U.S. Pat. No. 4,160,064 discloses a two-component epoxy sealant comprising a first band containing a curable epoxy resin composition and a separate, second band containing a curing agent for the curable epoxy resin composition. The epoxy resin composition also contains a coloring agent which imparts color to the first band but which loses its color when it comes into contact with the curing agent. The coloring agent in the first band makes it possible to ensure that the two bands are mixed uniformly prior to use of the sealant. Decolorization of the coloring agent begins as soon as the two components are mixed together and is said to be complete within a few minutes after mixing or, at the latest, on curing of the epoxy resin composition. The basic dyes disclosed in U.S. Pat. No. 4,160,064 are said to be not effective to impart latently transient color to the epoxy adhesive sealant if incorporated initially only in the curing agent.

U.S. Pat. No. 4,717,674 teaches a method for determining the extent of polymerization of a two-part epoxy system wherein the epoxy resin is labelled with a fluorescing dye having a reactivity similar to that of the curing agent for the epoxy resin. Fluorescence of the label changes as the curing reaction between the epoxy resin and the curing agent proceeds and, therefore, by studying the emission of the label it is possible to determine the extent of cure of the resin.

GB 960,276 describes a process for effecting a thorough mixing of a curing agent with an epoxy resin. Use is disclosed therein of a dye possessing properties of an acid-base indicator which dye is intimately mixed first with the epoxy resin and which changes color as the curing agent, added subsequently, becomes intimately mixed with the resin component.

All of the above-mentioned prior art documents relate only to two-part compositions and do not mention one-part systems. In fact, those systems disclosed wherein the color change is the result of the reactivity of the dye or pigment towards one or the other of the components of the two-part system, i.e. the resin or the curing agent, could not be adapted for use in a one-part adhesive system since such is necessarily a storage stable mixture containing both the curing agent and the resin.

Accordingly, the present invention provides an adhesive composition comprising a mixture of a one-part heat-curable adhesive and an effective amount of a substantially water-insoluble indicator material which is substantially unreactive with the adhesive at room temperature but which has the ability to produce a color change in the composition on curing of the adhesive.

The present invention further provides a method of adhesively joining two components comprising applying between facing surfaces of the components to be joined an adhesive composition comprising a mixture of a one-part heat-curable adhesive and a substantially water-insoluble indicator material which is substantially unreactive with the adhesive at room temperature but which has the ability to produce a color change in the composition on curing of the adhesive and applying heat to the join until the adhesive composition changes color indicating the cure of the adhesive.

More particularly the invention contemplates the provision, in a one-part adhesive composition including a mixture of adhesive composition ingredients comprising an adhesive and a curing agent reactive with the adhesive to effect curing of the adhesive only when the mixture is heated, by application of heat, to an elevated temperature above room temperature, of a substantially water-insoluble indicator material incorporated in the mixture, the water-insoluble indicator material being a material which does not undergo a directly thermally-induced color change when heated to the aforesaid elevated temperature and is substantially unreactive in the mixture at room temperature but undergoes a visible color change, when present in the mixture, upon and in response to reaction of the agent and the adhesive during the cure of the adhesive as aforesaid, the indicator material being present in the mixture in an amount effective to produce a visible color change in the composition upon curing of the adhesive, thereby to indicate attainment of a cured condition of the adhesive. Further, the invention particularly contemplates the provision of a method of adhesively bonding together two components comprising the steps of applying between the facing surfaces of the components to be bonded together a one-part adhesive composition including a mixture of adhesive composition ingredients comprising an adhesive, a curing agent reactive with the adhesive to effect curing of the adhesive only when the mixture is heated, by application of heat, to an elevated temperature above room temperature, and a substantially water-insoluble indicator material incorporated in the mixture, the water-insoluble indicator material being a material which does not undergo a directly thermally-induced color change when heated to the aforesaid elevated temperature and is substantially unreactive in the mixture at room temperature but undergoes a visible color change, when present in the mixture, upon and in response to reaction of the agent and the adhesive during the cure of the adhesive as aforesaid, the indicator material being present in the mixture in an amount effective to produce a visible color change in the composition upon curing of the adhesive, thereby to indicate attainment of a cured condition of the adhesive; and then heating the join until the adhesive changes color indicating the cure of the adhesive.

The advantage of the present invention over previously used one-part systems is that the color indication of the cure of the adhesive enables an adhesive bond to be cured reliably without the need for other monitoring systems, such as thermocouples inserted into the bond-line.

It has to be understood that the present invention relates to one-part heat-curable adhesive compositions. These comprise, as mentioned above, a curable resin composition in admixture with a curing agent which does not react with the curable resin composition at room temperature but which becomes activated at an elevated temperature after which activation it proceeds to react with the resin composition to cause curing thereof. Typically, one-part heat-curable adhesive compositions also contain an accelerator compound to accelerate the resin-curing agent reaction. In the case of one-part heat-curable epoxy systems, amine accelerators are conventionally used.

Heat-curable adhesives suitable for use in the present invention will be those that cure at fairly low temperatures and which are substantially unreactive with the indicator material at room temperature. Bearing in mind that cure of the adhesive component is indicated by a color change, a suitable adhesive component will not be one that would disguise the intended color change. It is especially preferred, in the present invention, to use a one part, heat-curable epoxy adhesive as the adhesive component in the composition since such materials are widely used in industrial bonding applications where high bond strength is required. Furthermore, in view of the fact that the present invention is especially useful for situations where curing of the adhesive is to be effected by the application of infrared radiation to the join, the use of one-part heat-curable epoxy adhesives is particularly suitable since these are curable at fairly low temperatures, e.g. at about 160° C. Such one-part epoxy adhesives are well known and comprise, in addition to the curable epoxy resin, a heat-activatable curing agent, typically dicyandiamide, and an amine accelerator. Dicyandiamide is insoluble in the epoxy resin at room temperature and therefore exists as a fine dispersion in the epoxy resin. Substantially no reaction occurs between the epoxy resin and the dicyandiamide at this stage. At temperatures above about 120° C., the dicyandiamide starts to dissolve into the epoxy resin after which dissolution the dicyandiamide and epoxy resin react together causing the curing of the resin. Because the reactivity of dicyandiamide towards epoxy resin is not great, an amine accelerator is included in the composition to increase the extent of reaction. A number of adhesives suitable for use in the present invention are available commercially, such as the one part heat-curable epoxy adhesive marketed under the code DP 70-0126 (Evode Ltd, Stafford). It is, in any event, easily determined by routine testing whether or not a heat-curable epoxy adhesive is suitable for use in the present invention.

The indicator materials useful in the present invention are ones that will not react substantially at room temperature (25° C.) with any of the components of the one-part system, i.e. the resin, the curing agent and the accelerator, if present. They must, instead, respond to the reaction within the adhesive during thermally-induced curing by changing color. These indicator materials are not ones that respond directly to temperature since, if they did, it would be impossible to distinguish between a cure cycle which heats the adhesive slowly and reaches the cure temperature momentarily and one which heats the adhesive rapidly to the cure temperature and holds it at that temperature for some time. Without being bound by theory, it is considered that the reaction within an epoxy adhesive undergoing thermally-induced cure is characterized by a change in the acidity or in the redox environment of the adhesive. Those conventional chemical indicators that are water-soluble are not, unfortunately, suitable for use in the present invention since the incorporation of water-soluble materials into one-part epoxy adhesives has a strongly adverse effect on the durability of loaded joints made with such an adhesive. However, conventional chemical indicators that are substantially insoluble in water and which meet the other requirements above may be suitable for use in the present invention. Bromocresol purple, which is substantially insoluble in water, may be used in the present invention although its use is limited due to the fact that one-part heat-curable epoxy adhesives containing bromocresol purple do not have long-term stability. One class of materials that are water-insoluble and which form colored derivatives on changes of pH or redox environment includes color formers of the type used in carbonless copying paper and described in the "Journal of the Society of Dyers and Colorists", 105, April 1989, pages 171–172. One such color former found to have excellent ability to produce a color change in a composition according to the invention on curing of the epoxy adhesive while having excellent stability at room temperature in the presence of the other components of the one part adhesive is Reaktred 448 (Badische Anilin and Soda Fabrik AG). Reaktred 448 is a fluoran color former (diazo rhodamine lactone) and has the IR spectra as shown in the attached FIGURE Azarhodamine lactones, color formers that may be used in the present invention, are disclosed in DE-A-2603101 (BASF). Another example of a color former that may be used is 1,2-benzo-6-diethylamine-fluoran (17b on page 172 of the "Journal of the Society of Dyers and Colorists", 105, April 1989). The amount of indicator material incorporated into the composition will, of course, depend on the initial and final colors (and their intensities) of the indicator material. Generally, the amount will be in the range of from 0.1% to 1.5% by weight based on the total weight of the composition.

The invention is of general application in bonding components, such as components of a metal structure, together.

BRIEF DESCRIPTION OF THE DRAWING

The attached FIGURE shows the IR spectra of Reaktred 448. Analysis was carried out on a Perkin Elmer 783 Infrared Spectrometer and the results recorded and analysed on a Perkin Elmer 7500 Professional Computer. The X-axis of the Figure represents wave number (cm$^{-1}$) of light passed into a sample of Reaktred 448 dissolved in 1,1,2-trichlorotrifluoroethane and smeared onto a KBr disc. The Y-axis is the percentage of the incident light transmitted through the sample.

EXAMPLE 1

An adhesive composition according to the invention was prepared by mixing a one-part heat-curable epoxy adhesive DP 70-0126 (Evode Ltd, Stafford) with 1.5% by weight of the total composition of the colour former Reaktred 448 (BASF), in a mechanical mixer. The properties of the mixture are shown below.

| Effect on adhesive viscosity after 8 weeks at 25° C. | Initial Color | Color I | Color II | Color III |
|---|---|---|---|---|
| slight thickening | orange | orange | yellow | yellow | where color I is after 30 mins at 120° C.; color II is after 30 mins at 160° C.; color III is after 30 mins at 180° C.

The reaction of the epoxy adhesive is incomplete after 30 minutes at 120° C. but the color change of the indicator in the composition heated for 30 minutes at 160° C. and the lack of extra color change in the composition heated at 180° C. shows that cure of the adhesive was substantially complete after 30 mins at 160° C. It is clear from these results that Reaktred 448 represents a useful material to incorporate into epoxy adhesive; it does not change color until the cure is complete and it does not affect the adhesive adversely.

EXAMPLE 2

The following adhesive compositions according to the invention were prepared.
Composition A: DP 70-0126 (Evode Ltd.) +1% by weight Reaktred 448 (BASF)
Composition B: DP 70-0126 (Evode Ltd.)+1% by weight bromocresol purple. (5,5'-dibromo-o-cresol-sulphonephthalein)

The mixtures were made by grinding in the color-forming components into the adhesive paste. Neither caused an immediate reaction with the adhesive. All the adhesives were made into standard single-lap joints with 1.6 mm gauge 5251 aluminium alloy which had been pretreated beforehand with the no-rinse chromate pretreatment "Accomet C" (supplied by Albright and Wilson). The joints were cured for 15 minutes at 180° C., this being a recommended cure schedule for this adhesive. The joints were exposed to neutral saltspray for 20 weeks and the fall-off in strength was monitored by breaking three replicates of each mixture in a tensile tester both before and after the test. The tests were also carried out using DP 70-0126 with no added color-forming component. Results were as follows:

| Adhesive Composition | average initial strength (MPa) | average strength after 20 weeks exposure (MPa) |
|---|---|---|
| DP 70-0126 | 17.1 | 16.1 (94% retention) |
| A | 16.1 | 15.6 (97% retention) |
| B | 17.3 | 16.4 (95% retention) |

EXAMPLE 3

A mixture of 100 g of Epoxyweld 7168 (a proprietary one-part heat-curable epoxy composition from Evode Ltd) and 1 g of Reaktred 448 was blended together for 1 hour on an electric mortar and then repackaged. After 3 months storage at room temperature (25° C.) the mixture was analyzed and found not to have increased in viscosity or to have decreased in chromotropic behaviour (color change from pink to yellow) on the cure of the resin.

I claim:

1. A composition consisting essentially of a one-part adhesive composition which consists essentially of a mixture of an adhesive; a curing agent reactive with said adhesive to effect curing of said adhesive only when the mixture is heated, by application of heat, to an elevated temperature above room temperature; and a substantially water-insoluble indicator material incorporated in said mixture, said water-insoluble indicator material being a fluoran color former which does not undergo a directly thermally-induced color change when heated to said elevated temperature and is substantially unreactive in the mixture at room temperature but undergoes a visible color change, when present in the mixture, upon and in response to reaction of the agent and the adhesive during the cure of the adhesive as aforesaid, said indicator material being present in said mixture in an amount effective to produce a visible color change in the composition upon curing of the adhesive, thereby to indicate attainment of a cured condition of the adhesive.

2. A composition according to claim 1, wherein the one-part heat-curable adhesive is an epoxy adhesive.

3. A composition according to claim 2, wherein the adhesive is curable at a temperature of about 160° C.

4. A method of adhesively bonding together two components comprising the steps of applying between the facing surfaces of the components to be bonded together a composition consisting essentially of a one-part adhesive composition which consists essentially of a mixture of an adhesive, a curing agent reactive with said adhesive to effect curing of said adhesive only when the mixture is heated, by application of heat, to an elevated temperature above room temperature, and a substantially water-insoluble indicator material incorporated in said mixture, said water-insoluble indicator material being a fluoran color former which does not undergo a directly thermally-induced color change when heated to said elevated temperature and is substantially unreactive in the mixture at room temperature but undergoes a visible color change, when present in the mixture, upon and in response to reaction of the agent and the adhesive during the cure of the adhesive as aforesaid, said indicator material being present in said mixture in an amount effective to produce a visible color change in the composition upon curing of the adhesive, thereby to indicate attainment of a cured condition of the adhesive; and then heating the joint until the adhesive changes color indicating the cure of the adhesive.

5. A method according to claim 4, wherein the one-part heat-curable adhesive is an epoxy adhesive.

6. A method according to claim 5, wherein the curing of the adhesive takes place at a temperature of about 160° C.

7. A method according to claim 4, wherein heat is applied to the join as infra-red radiation.

* * * * *